(12) United States Patent
Almubaelesh et al.

(10) Patent No.: US 10,132,017 B1
(45) Date of Patent: Nov. 20, 2018

(54) FISH HOOK TYING TOOL

(71) Applicants: Abdulrahman Kh. Abdulaziz Almubaelesh, Safat (KW); Meshari Y. Y. Al-Dhouwihi, Safat (KW); Abdulaziz Kh. Abdulaziz Almubaelesh, Safat (KW)

(72) Inventors: Abdulrahman Kh. Abdulaziz Almubaelesh, Safat (KW); Meshari Y. Y. Al-Dhouwihi, Safat (KW); Abdulaziz Kh. Abdulaziz Almubaelesh, Safat (KW)

( * ) Notice: Subject to any disclaimer, the term of this patent is extended or adjusted under 35 U.S.C. 154(b) by 0 days.

(21) Appl. No.: 16/046,934

(22) Filed: Jul. 26, 2018

Related U.S. Application Data

(60) Provisional application No. 62/543,391, filed on Aug. 10, 2017.

(51) Int. Cl.
*D04G 5/00* (2006.01)
*A01K 97/06* (2006.01)
*F16M 13/02* (2006.01)
*F16B 2/06* (2006.01)

(52) U.S. Cl.
CPC .............. *D04G 5/00* (2013.01); *A01K 97/06* (2013.01); *F16B 2/065* (2013.01); *F16M 13/022* (2013.01)

(58) Field of Classification Search
CPC .......... D04G 5/00; A01K 83/00; A01K 83/04; A01K 97/00; A01K 97/06; A01K 97/26; A01K 97/28; A01K 85/08; A01K 91/04; F16B 2/06; F16B 2/065; F16M 13/022; B65H 69/04
See application file for complete search history.

(56) References Cited

U.S. PATENT DOCUMENTS

| | | | | |
|---|---|---|---|---|
| 1,814,464 A | * | 7/1931 | Baltzley | A01K 83/00 242/441.2 |
| 2,498,920 A | * | 2/1950 | Holland | A01K 91/04 289/17 |
| 3,419,924 A | | 1/1969 | Archibald | |
| 3,606,405 A | | 9/1971 | Lally | |
| 3,667,790 A | * | 6/1972 | Taylor et al. | A01K 91/04 289/17 |
| 4,401,328 A | * | 8/1983 | Yamada | A01K 91/04 289/17 |

(Continued)

FOREIGN PATENT DOCUMENTS

JP   04258240 A   9/1992

*Primary Examiner* — Ismael Izaguirre
(74) *Attorney, Agent, or Firm* — Richard C. Litman

(57) ABSTRACT

The fish hook tying tool provides a rotating fish hook holder for a fish hook, and an adjacently mounted cutter for a fishing line, thus providing a combined tool for assisting a fisherman in tying fishing line to a fish hook and the trimming the knot after tying the fishing line. The fish hook tying tool includes a hollow housing having opposed front and rear walls, the front wall having an arcuate slot defined therein. In use, the user slides a lug along a path defined by the arcuate slot to drive rotation of a drive gear mounted within the hollow housing. Manual rotation of the drive gear drives a pinion to rotate, which, in turn, selectively drives a coaxially mounted fish hook holder to rotate with the shank and eye of the fish hook extending away from the tool. An attached clamp secures the tool to a support.

16 Claims, 4 Drawing Sheets

(56) References Cited

U.S. PATENT DOCUMENTS

| | | | |
|---|---|---|---|
| 6,401,442 B1 * | 6/2002 | Root | A01K 97/26 57/10 |
| 7,309,086 B2 | 12/2007 | Carrier | |
| 8,511,721 B1 | 8/2013 | Farner et al. | |
| 9,185,894 B1 | 11/2015 | Almubaelesh et al. | |
| 9,474,259 B2 * | 10/2016 | Banda | A01K 91/04 |
| 2015/0327528 A1 | 11/2015 | O'Neal | |

* cited by examiner

FISH HOOK TYING TOOL

CROSS-REFERENCE TO RELATED APPLICATION

This application claims the benefit of U.S. Provisional Patent Application Ser. No. 62/543,391, filed on Aug. 10, 2017.

BACKGROUND

1. Field

The disclosure of the present patent application relates to fishing gear, and particularly to a fish hook tying tool for tying fishing line to a fish hook and cutting the fishing line to trim loose ends from the knot.

2. Description of the Related Art

Fishing is a common pastime that is typically performed with little more than a basic fishing rod, fishing line and a fish hook. One of the primary skills required for successful fishing is in the proper use of this equipment. For conventional hook-and-line or angling fishing, a fisherman should be skilled in the art of tying the fish hook to the fishing line. Various knots are available to securely tie the fish hook. One of the most common types of knot is a slip knot, similar to the one used in a hangman's noose. This type of knot provides a very secure connection to the eye of the fish hook and strengthens the line near the eye. A secure knot assists in preventing the line from snapping off at the hook, especially during instances of vigorous activity from the hooked fish.

Unfortunately, very few fishermen know how to tie such knots, or they are not dexterous enough for the task. Such knot tying can be a time-consuming process, even for more experienced fishermen. Many solutions have been suggested to assist fishermen in this process, but most involve a type of bracket that functions as an aid, or a passive guide that assists the user in tying the knot, rather than an active device that assists the knot tying process through actual movement.

Fish hooks are often made from very thin gauge wire, so that it is sometimes difficult to hold the shank of the hook still while manipulating the free end of the fishing line while tying the knot. Also, the point of the hook is quite sharp, and often has at least one barb, so that there is sometimes a risk of accidently being pricked while manipulating the fish hook. Some knots used to secure the fishing line to the fish hook, such as the jam knot shown in FIGS. 2A-2D of our prior patent, U.S. Pat. No. 9,185,894, issued Nov. 17, 2015 (which is hereby incorporated by referenced in its entirety), require wrapping or coiling the free end of the fishing line around the standing line. A tool that can hold the fish hook steady, but that can also rotate the eye and shank of the hook as needed to assist in tying the fishing line to the hook would be useful to the fisherman. Thus, a fish hook tying tool solving the aforementioned problems is desired.

SUMMARY

The fish hook tying tool provides a rotatable holder for a fish hook, and also has an adjacently mounted cutter for a fishing line, thus providing a combined tool for assisting a fisherman in tying a fishing line to a fish hook and then trimming loose ends of the knot after the line has been tied to the hook. The fish hook tying tool includes a hollow housing having opposed front and rear walls. The front wall has an arcuate slot defined therein. A main drive gear is rotationally mounted within the hollow housing. A handle or lug is attached to the drive gear and at least partially projects through the arcuate slot formed through the front wall of the hollow housing. A pinion gear is also rotationally mounted within the hollow housing and meshes with the drive gear such that rotation of the drive gear drives rotation of the pinion.

The fish hook holder has an eye disposed outside the tool housing and a shaft extending through the front wall and the pinion, the end of the shaft being supported in a blind hole or blind bore in the rear wall of the housing. The shaft of the holder has a key that engages a keyway defined in the center of the pinion so that rotation of the pinion inside the housing causes rotation of the eye of the holder outside the housing. The point and hook of the fish hook are inserted into the eye of the fish hook holder to support the fish hook with the shank and eye of the fish hook extending away from the housing. When the user manually slides the handle or lug along a path defined by the arcuate slot to drive rotation of the drive gear, the pinion rotates, resulting in selective rotation of the fish hook. The line cutter is mounted to the front wall of the hollow housing for cutting the free end of the fishing line after the knot is tied.

Additionally, a clamp may be provided for securing the hollow housing to a support surface, such as a chair leg, a table or the like. The clamp is U-shaped, having a cross plate and opposing first and second legs extending from opposite ends of the cross plate. A clamp bolt is adjustably positioned between the first and second legs to secure the clamp to the support surface. The tool's housing is secured to an outer face of the first leg by thumb screws to selectively mount the tool on the clamp.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
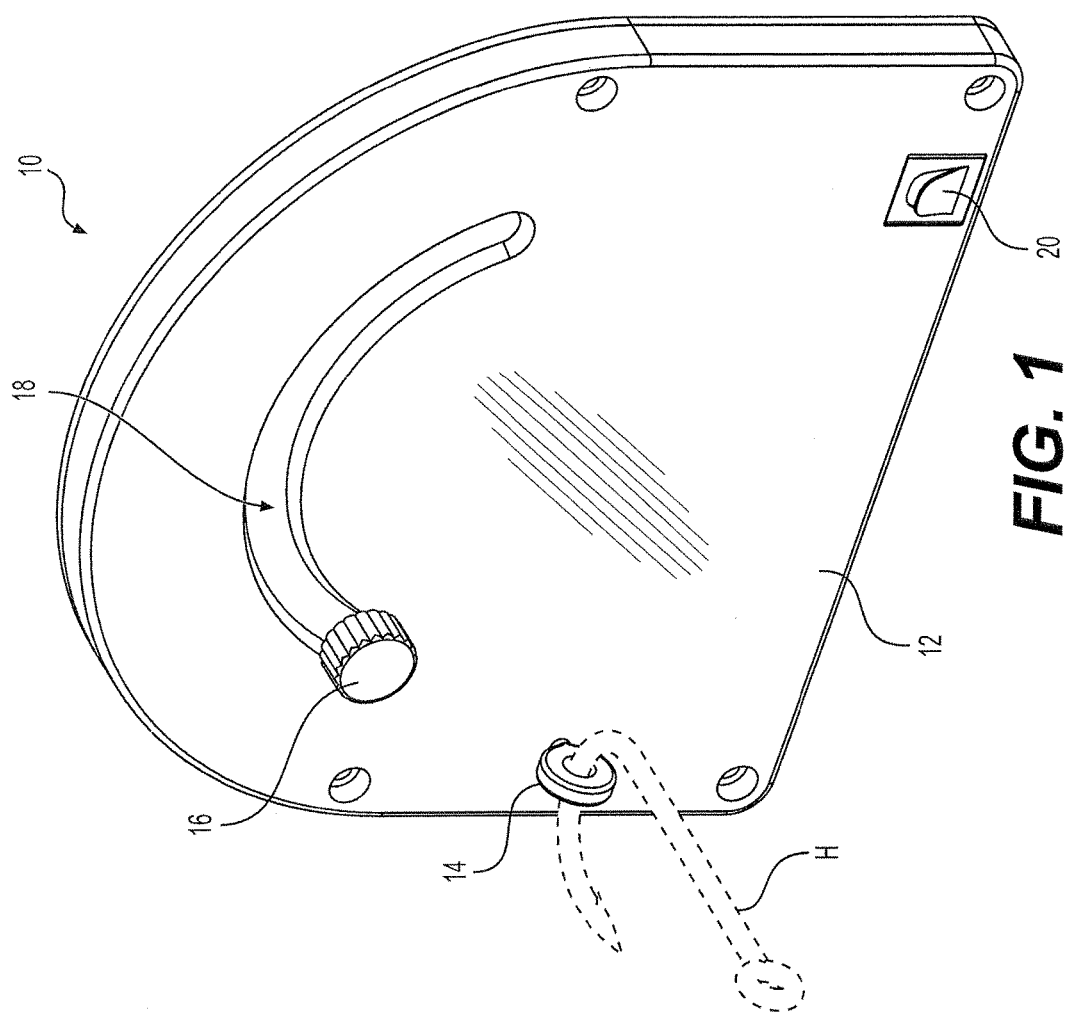
FIG. 1 is a perspective view of a fish hook tying tool.
Figure 2:
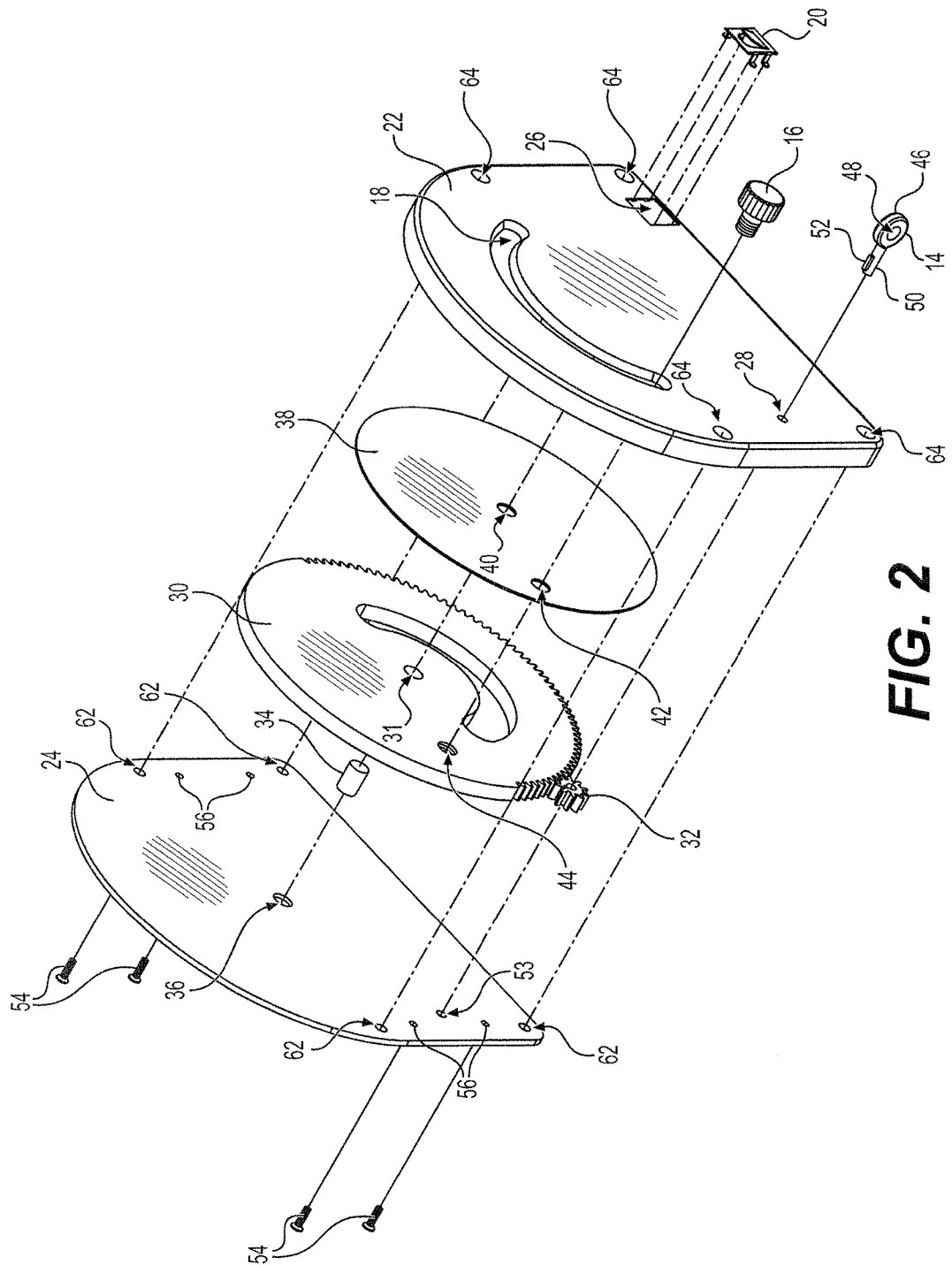
FIG. 2 is an exploded perspective view of the fish hook tying tool of FIG. 1.

Referring to FIGS. 1 and 2, the fish hook tying tool 10 provides a rotating fish hook holder 14 for a fish hook H, and an adjacently mounted cutter 20 for a fishing line, thus providing a combined tool for assisting a fisherman in the tying of fishing line to a fish hook H and trimming the fishing line after the knot is tied. It should be understood that the fish hook H is shown in FIG. 1 for exemplary purposes only, and that fish hook holder 14 may be dimensioned and configured to receive any desired type of fish hook.

The fish hook tying tool 10 includes a hollow housing 12 having opposed front and rear walls 22, 24, respectively. The front wall 22 has an arcuate slot 18 defined therein. It should be understood that the overall dimensions and configuration of the hollow housing 12 are shown for exemplary purposes only. As shown in FIG. 2, a main drive gear 30 is rotationally mounted within the hollow housing 12, and a lug or handle 16 is attached eccentrically to the face of the drive gear 30 and at least partially projects through the arcuate slot 18 defined in the front wall 22 of the hollow housing 12. A pinion 32 is also rotationally mounted within the hollow housing 12 and meshes with the drive gear 30 (the drive gear 30 and the pinion 32 both being spur gears) such that rotation of the drive gear 30 drives rotation of the pinion 32.

As shown in FIG. 2, a hub or central aperture 31 is formed in the drive gear 30 for mounting the drive gear on an axle 34, which has a rear end that may be at least partially received within a blind hole or blind bore 36 defined in the rear wall 24. The axle 34 has a front end similarly mounted to a rear face of the front wall 22. It will be noted that the ends of the axle 34 may be mounted for rotation in bushings or bearings mounted in the blind holes or blind bores 36, the drive gear 30 being fixed to the axle for rotation therewith, or the axle 34 may be fixed to the front and rear walls 22, 24 and the drive gear 30 may be rotatably mounted on the axle 34 by a bearing in the hub 31 of the drive gear 30. A gear protector plate 38 may be disposed between the drive gear 30 and the front wall 22 of the hollow housing 12 to provide protection and stability for the drive gear 30. As shown, the axle 34 further passes through a hub or central opening 40 in the gear protector plate 38, which may be fixed to the axle 34 for rotation therewith or rotatably mounted on the axle 34. The handle 16 also passes through the gear protector plate 38 (via passage through peripheral opening 42) before being fixed to the bore 44 in the drive gear 30 (e.g., the shaft of the lug or handle 16 may be externally threaded and the bore 44 in the drive gear 30 may be internally threaded) such that the gear protector plate 38 rotates with the primary gear 30.

The fish hook holder 14 has an eye 46 and a shank or shaft 50 extending from the eye 46. The eye 46 may be dimensioned and configured for receiving and snugly supporting hooks H of a particular gauge (or range of gauges), or may have a resilient washer 48 (or natural or artificial rubber or other resilient material) mounted within the eye 46 for resiliently gripping hooks H of different gauges. The eye 46 is positioned exterior to the housing 12, as shown in FIG. 1. The shank or shaft 50 extends within the hollow housing 12 so that the pinion 32 is mounted thereon. The shank or shaft 50 has a key mounted thereon that engages a keyway defined in the hub of the pinion 32. The end of the shank or shaft 50 may be rotatably mounted in a low friction bushing or bearing 53 in the rear wall 24 to support the pinion 32 and keep it in mesh with the drive gear 30. In use, the user slides the lug or handle 16 along the path defined by the arcuate slot 18 to drive rotation of the drive gear 30 (and the gear protector plate 38), which, in turn, drives the pinion 32 to selectively drive the fish hook holder 14 to rotate. The line cutter 20 (a blade) is mounted to the front wall 22 of the hollow housing 12 for cutting the fishing line after the knot is tied. In FIG. 2, it should be understood that the line cutter 20, which is shown as being mounted within an aperture 26 formed through front wall 22, is shown for exemplary purposes only. The line cutter 20 may be any suitable type of cutting device, blade, or the like for cutting fishing line. Further, the overall dimensions and configuration of the line cutter 20 and aperture 26 are shown for exemplary purposes only. Additionally, it should be understood that line cutter 20 may be secured to front wall 22 by any suitable type of attachment.

In FIG. 2, conventional screws 54 are shown passing through openings 56 in the rear wall 24 for securing the rear wall 24 to internally threaded bores or bosses on the rear face of the front wall 22. It should be understood that the rear wall 24 may be secured to the front wall 22 by any suitable type of attachment (screws, rivets, etc.).

Figure 3:
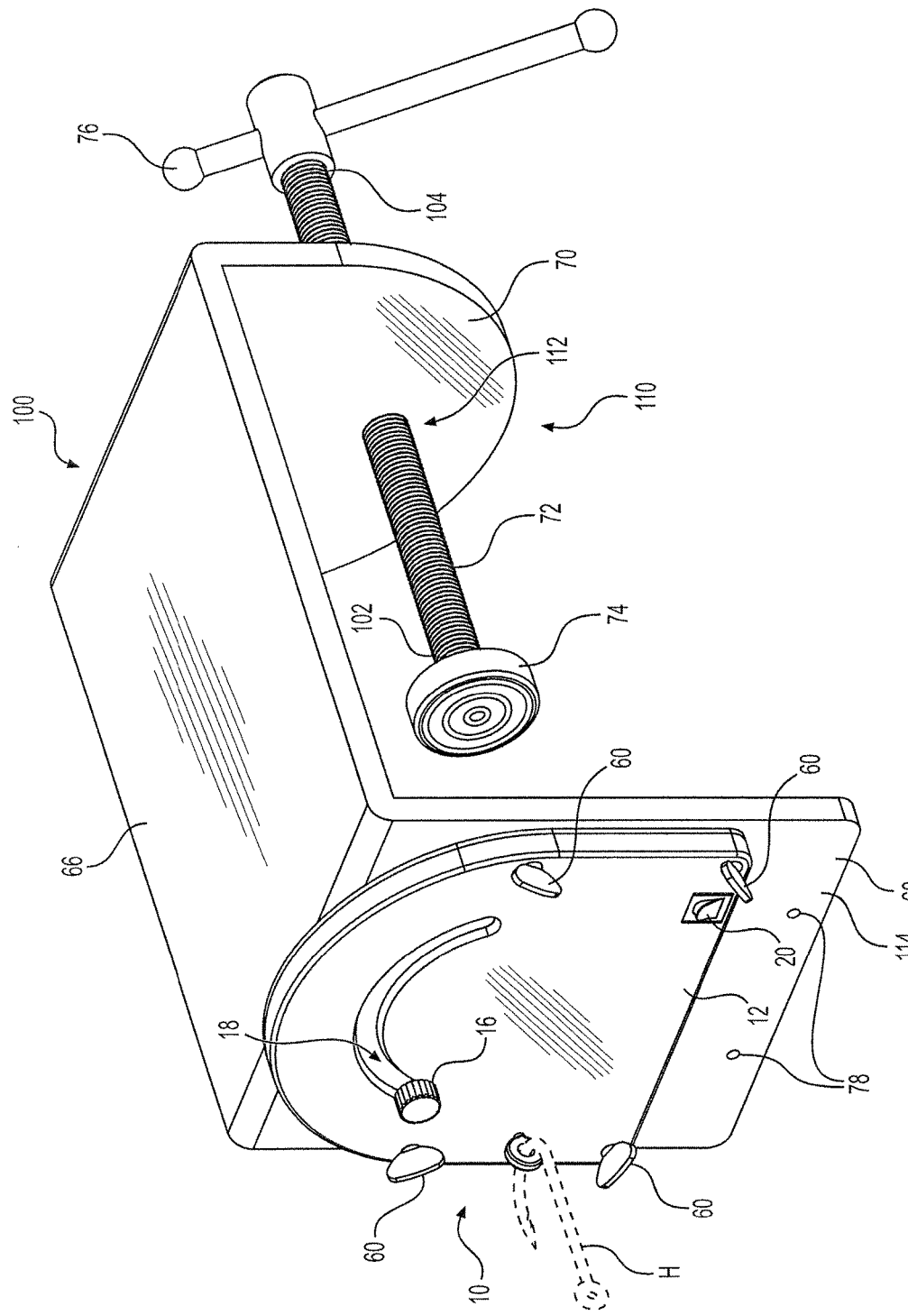
FIG. 3 is a perspective view of the fish hook tying tool of FIG. 1 selectively attached to a support clamp with the hook disposed horizontally.
Figure 4:
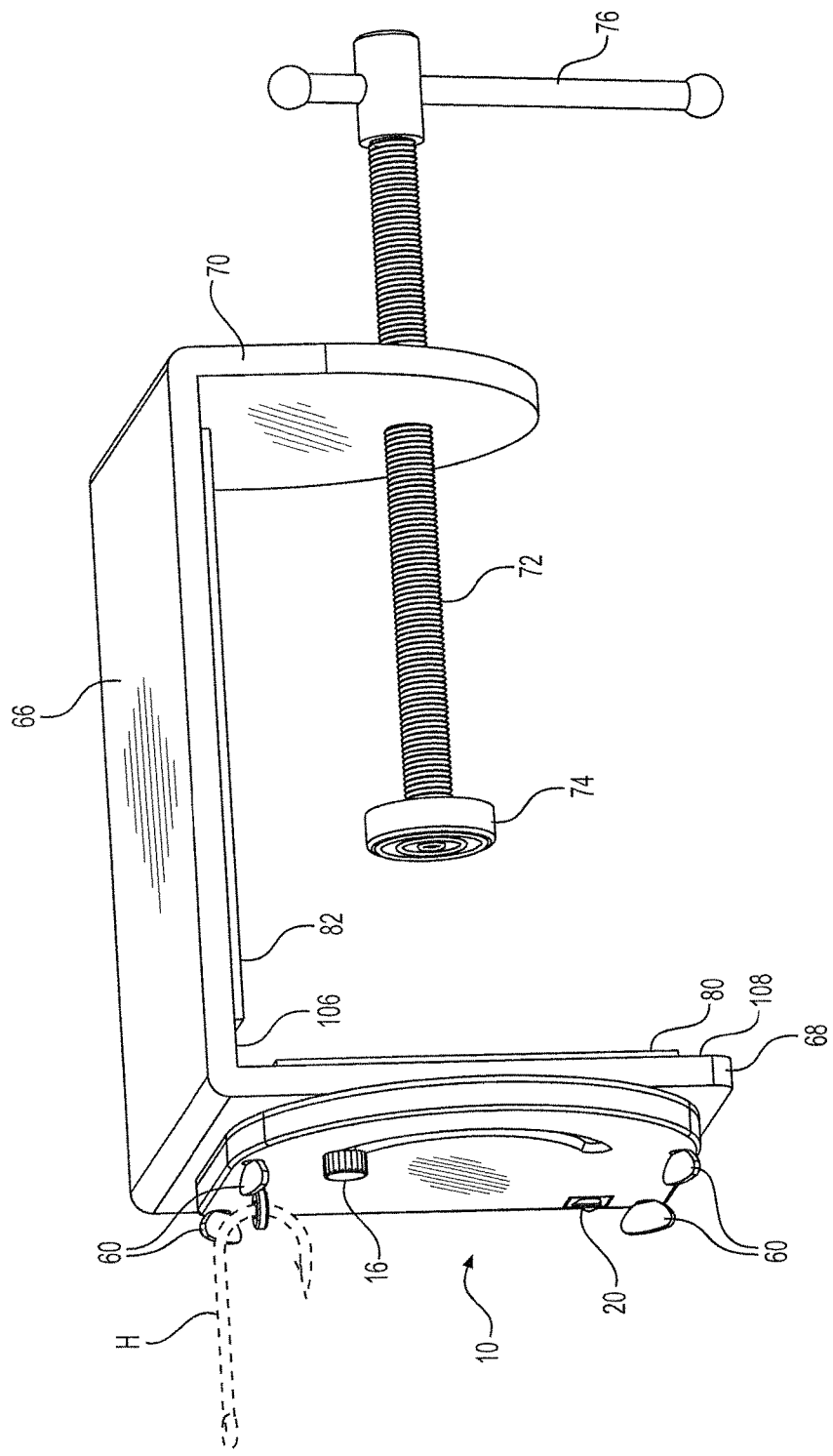
FIG. 4 is a perspective view of the fish hook tying tool of FIG. 1 selectively attached to the support clamp with the hook disposed vertically.

Although it might be possible to use the tool as described thus far as a standalone handheld tool, it might be difficult to hold the housing 12 and manipulate the fishing line and the fish hook H to tie the line to the hook H, and much of the convenience of the tool might be lost. Accordingly, as shown in FIG. 3, a clamp 100 may be provided for securing the hollow housing 12 to a support surface, such as a chair leg, a table or the like. The clamp 100 includes a cross plate 66 and opposing first and second legs 68, 70 extending from opposite ends of the cross plate 66. The rear wall 24 of the hollow housing 12 is secured to an outer face 114 of the first leg 68. In the example of FIGS. 3 and 4, thumb screws 60 are shown passing through openings 64 in the front wall 22 and openings 62 in the rear wall 24 in order to engage corresponding internally threaded openings formed in the first leg 68 of the clamp 100. It should be understood that thumb screws 60, along with corresponding pass-through openings 62, 64, are shown for exemplary purposes only, and that the hollow housing 12 may be secured to the outer face 114 of the first leg 68 by any suitable type of attachment. Further, as shown in FIG. 3, additional sets of openings 78 may be formed through first leg 68. This allows the user to engage thumb screws 60 with other sets of openings for mounting hollow housing 12 in an alternative position. FIG. 3 shows the housing 12 mounted with the slot 18 extending from the ten o'clock to the two o'clock position. FIG. 4 shows the housing 12 mounted with the slot 18 extending from the one o'clock to the five o'clock position. This allows the user to mount the fish hook tying tool 10 to a wide variety of support surfaces and/or position the fish hook tying tool 10 in a more desirable orientation.

It should be understood that any suitable type of clamp may be utilized. In FIGS. 3 and 4, the clamp 100 further includes a threaded bolt 72 having opposed first and second ends 102, 104, respectively. The threaded bolt 72 extends through a threaded aperture 112 formed through the second leg 70 such that the first end 102 of the threaded rod 72 is positioned within the gap 110 defined between the first and second legs 68, 70. A clamping disc 74 may be mounted on the first end 102 of the threaded bolt 72. The clamping disc 74 may be made of rubber or metal with a rubber cover on the face of the disc, providing both cushioning and enhanced frictional gripping for the support surface. Similarly, as shown in FIG. 4, a first elastomeric sheet or resilient cushion 82, formed from rubber or the like, may be secured to an inner face 106 of the cross plate 66, and a second elastomeric sheet or resilient cushion 80, also formed from rubber or the like, may be secured to an inner face 108 of the first leg 68. The elastomeric sheets 80, 82 also provide cushioning and enhanced frictional gripping for the support surface. Further, it should be understood that the clamping handle 76, shown slidably mounted on a bolt head at the second end 104 of the threaded bolt 72, is shown for exemplary purposes only, and that any suitable type of handle or grip may be used for tightening or loosening the clamp bolt 72 to clamp a support between the clamping disc 74 and the first leg 68.

In use, the fisherman inserts the pointed end of the fishing hook H through the eye 46 of the fish hook holder 14 and uses the lug or handle 16 to rotate the fish hook H to provide convenient access for threading the fishing line through the eye of the fish hook. With the line passed through the eye of the fish hook, the fisherman ties a knot in the line to secure the fish hook H, rotating the holder 14 using the lug or handle 16 to drive the gear 30 and pinion as needed. After tying the knot, the cutter 20 is used to trim the free end of the fishing line, if necessary.

It is to be understood that the fish hook tying tool is not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fish hook tying tool, comprising:
   a hollow housing having opposed front and rear walls, the front wall having an arcuate slot defined therein;
   a drive gear rotationally mounted within the hollow housing;
   a lug eccentrically mounted on the drive gear and at least partially projecting through the arcuate slot defined in the front wall of the hollow housing so that manually sliding the lug along the arcuate slot rotates the drive gear;
   a pinion rotationally mounted within the hollow housing and meshing with the drive gear such that rotation of the drive gear drives rotation of the pinion;
   a fish hook holder having an eye and a shaft extending from the eye, the eye being adapted for removably receiving a pointed end of a fish hook and supporting the fish hook with an eye and a shank of the fish hook extending away from the holder, the shaft extending into the hollow housing, the pinion being mounted on the shaft such that the fish hook holder is slaved to rotate when the pinon is driven to rotate by the drive gear, whereby rotation of the pinion drives rotation of the fish hook holder; and
   a line cutter mounted to the front wall of the hollow housing for trimming loose ends of fishing line in knots tied to the fish hook.

2. The fish hook tying tool as recited in claim 1, further comprising a gear protector plate rotationally mounted between the drive gear and the front wall of the hollow housing.

3. The fish hook tying tool as recited in claim 2, wherein the lug extends through the gear protector plate so that the gear protector plate rotates with the drive gear.

4. The fish hook tying tool as recited in claim 1, further comprising a clamp for clamping the tool to a support, the hollow housing being selectively secured thereto.

5. The fish hook tying tool as recited in claim 4, wherein the clamp comprises:
   a U-shaped frame having spaced apart, opposing first and second legs;
   a threaded bolt extending through a threaded aperture defined in the first leg, the bolt having a handle end outside the frame and a clamping end disposed between the first and second legs;
   a handle slidably disposed on the handle end of the bolt; and
   a clamping disc mounted on the clamping end of the bolt, the disc having a resilient face adapted for bearing against the support;
   whereby the threaded bolt is tightened to clamp the support between the clamping disc and the second leg of the frame.

6. The fish hook tying tool as recited in claim 5, further comprising a resilient cushion attached to the U-shaped clamp frame and extending between the first and second legs.

7. The fish hook tying tool as recited in claim 6, further comprising a second resilient cushion attached to the second leg to bear against the support.

8. A fish hook tying tool, comprising:
   a hollow housing having opposed front and rear walls, the front wall having an arcuate slot defined therein;
   a drive gear rotationally mounted within the hollow housing;
   a lug eccentrically mounted on the drive gear and at least partially projecting through the arcuate slot formed through the front wall of the hollow housing, the lug rotating the drive gear through an arc when the lug is manually slid along the arcuate slot;
   a pinion rotationally mounted within the hollow housing and meshing with the drive gear such that rotation of the drive gear drives rotation of the pinion, the pinion having a central hub having a keyway defined therein;
   a fish hook holder having an eye and a shaft extending from the eye, the eye being adapted for removably receiving a pointed end of a fish hook and supporting the fish hook with an eye and a shank of the fish hook extending away from the holder, the shaft extending into the hollow housing, the shaft having a key thereon, the pinion being mounted on the shaft with the key engaging the keyway such that the fish hook holder rotates when the pinon is driven to rotate by the drive gear, whereby rotation of the pinion drives rotation of the fish hook holder;
   a line cutter mounted to the front wall of the hollow housing for trimming loose ends of fishing line in knots tied to the fish hook; and
   a clamp having a U-shaped frame having spaced apart, opposing first and second legs and a clamping disc adjustably disposed between the first and second legs for clamping the frame to a support between the disc and the second leg, the housing being selectively attached to the first leg of the frame.

9. The fish hook tying tool as recited in claim 8, further comprising a gear protector plate rotationally mounted between the drive gear and the front wall of the hollow housing.

10. The fish hook tying tool as recited in claim 9, wherein the lug extends through the gear protector plate so that the gear protector plate rotates with the drive gear.

11. The fish hook tying tool as recited in claim 8, wherein the clamp further comprises a threaded bolt having a handle end and a clamping end, the threaded bolt extending through a threaded aperture defined in the first leg, the handle end extending outside the U-shaped frame, the clamping disc being attached to the clamping end, the handle end having a slidable handle attached thereto.

12. The fish hook tying tool as recited in claim 8, further comprising a first resilient cushion attached to the U-shaped frame and extending between the first and second legs.

13. The fish hook tying tool as recited in claim 12, further comprising a second resilient cushion attached to the second leg to bear against the support.

14. The fish hook tying tool according to claim 8, wherein said housing has a plurality of pass-through holes defined in the front and rear walls and the second leg of said U-shaped clamp frame has a plurality of internally threaded bores defined therein, the fish hook tying tool further comprising a plurality of thumb screws extendable through the pass-through holes to engage the internally threaded bores to selectively attach said housing to said clamp.

15. The fish hook tying tool according to claim 8, wherein the rear wall of said housing has a blind bore defined therein, the shaft of said fish hook holder being rotatably supported in the blind bore in order to maintain and support the pinion meshed with said drive gear.

16. The fish hook tying tool according to claim 8, further comprising a resilient washer supported in the eye of said fish hook holder for resiliently retaining a hook end of fish hooks of different gauges in said fish hook holder.

* * * * *